United States Patent [19]
Sakai et al.

[11] Patent Number: 5,543,224
[45] Date of Patent: Aug. 6, 1996

[54] HIGH MOLECULAR ELECTRET FILM

[75] Inventors: Toshihisa Sakai; Masanori Kawasumi, both of Osaka, Japan

[73] Assignee: Mita Industrial Co., Ltd., Osaka, Japan

[21] Appl. No.: 419,553

[22] Filed: Apr. 10, 1995

[30]     Foreign Application Priority Data

Apr. 11, 1994  [JP]  Japan .................. 6-072235

[51] Int. Cl.⁶ .................................. B32B 27/00
[52] U.S. Cl. ............ 428/409; 428/35.7; 428/35.8; 428/36.9; 428/411.1; 428/461; 428/462; 430/120; 430/122; 492/53; 307/400
[58] Field of Search ............... 428/35.7, 35.8, 428/36.9, 409, 411.1, 461, 462; 525/68, 132, 152; 430/102, 120, 122; 307/400; 492/53; 355/251, 259, 274

[56]           References Cited

U.S. PATENT DOCUMENTS

| | | | |
|---|---|---|---|
| 3,383,435 | 5/1968 | Cizek | 525/132 |
| 3,612,778 | 10/1971 | Murphy | 381/191 |
| 3,850,676 | 11/1974 | Madrid et al. | 430/108 |
| 3,960,811 | 6/1976 | Bennett et al. | 528/495 |
| 4,086,499 | 4/1978 | Mishra . | |
| 4,522,907 | 6/1985 | Mitsuhashi et al. | 430/102 |
| 5,162,608 | 11/1992 | Matsuda et al. | 118/657 |
| 5,196,888 | 3/1993 | Matsuda et al. | 355/251 |

OTHER PUBLICATIONS

*Encyclopedia of Polymer Science and Engineering*, vol. 13, 1988, pp. 1–8, 19–20, 25–30 "Poly(phenylene ether)".

Primary Examiner—Patrick Ryan
Assistant Examiner—Marie R. Yamnitzky
Attorney, Agent, or Firm—Sherman and Shalloway

[57]           ABSTRACT

A high molecular electret film which comprises an electret film of a blend of a poly(2,6-dialkyl-1,4-phenylene oxide) consisting of a recurring unit represented by the following general formula (1), wherein R is an alkyl group having not more than 4 carbon atoms,
and a styrene resin. The electret film exhibits vary favorable electric charge-retaining property and favorable adhesiveness to metals. The film is very effectively used for a developing sleeve in an electrophotographic apparatus, for a cleaning device, for a transfer device, etc. and exhibits desired effects stably and for extended periods of time.

15 Claims, 1 Drawing Sheet

HIGH MOLECULAR ELECTRET FILM

BACKGROUND OF THE INVENTION

1. Field of the Invention

The present invention relates to a high molecular weight electret film and to a sleeve for conveying a developing agent by providing the high molecular weight electret film on an electrically conducting sleeve.

2. Description of the Prior Art

A so-called magnetic-brush developing device has heretofore been widely used as a developing device for commercial electrophotographic apparatuses, according to which image is developed and is formed by electrically charging a two-component-type developing agent of a mixture of, for example, a magnetic carrier and an electroscopic toner or by electrically charging a one-component-type developing agent which by itself contains a magnetic powder, by forming a magnetic brush of the developing agent on a sleeve for conveying the developing agent that contains a magnet therein, conveying the magnetic brush onto the surface of a photosensitive material having electrostatic latent image, and by rubbing the surface with the magnetic brush in a bias electric field.

A method has recently been proposed to effect the developing by conveying the developing agent by using, as a sleeve for conveying the developing agent, an electrically conducting sleeve on which a high molecular weight electret film is provided. In a developing device using such a sleeve for conveying the developing agent, use is made of a nonmagnetic one-component-type developing agent which is conveyed relying only upon the electric attractive force (coulomb force) without using magnet and without forming a magnetic brush of the developing agent, giving advantage that the apparatus can be simply constructed.

Here, the electret is a dielectric that exhibits a permanent electric polarizing action. As high molecular electrets, there have been known electrets of various thermoplastic resins. Among them, an ethylene tetrafluoride/propylene hexafluoride copolymer (FEP) and a poly(4-methylpentene) have been known for their very high electric charge-retaining property.

However, the above-mentioned FEP and the like are sparingly soluble in a solvent making it difficult to prepare a suitable coating solution and, hence, making it difficult to form a film on the electrically conducting sleeve. As the electret film to be provided on the electrically conducting sleeve, therefore, the one made of a polystyrene has been proposed from such a standpoint that it enables a coating solution to be prepared for forming a film and that it has an electric charge-retaining property though it is not as high as that of the FEP (see Japanese Laid-Open Patent Publication No. 130128/1980).

However, the electret film such as of polystyrene obtained by being applied onto the electrically conducting sleeve followed by drying develops cracks when a predetermined period of time passes after drying, causing the surface potential to be attenuated, and is still unsatisfactory from the standpoint of stably conveying the electrically charged toner for extended periods of time.

SUMMARY OF THE INVENTION

The assignment of the present invention therefore is to provide a high molecular weight electret film which has excellent electric charge-retaining property, can be easily formed on an electrically conducting sleeve by being applied and drying, and does not develop cracks even when extended periods of time have passed after the application and drying.

Another assignment of the present invention is to provide a sleeve for conveying developing agent obtained by providing the above-mentioned high molecular weight electret film on the electrically conducting sleeve.

According to the present invention, there is provided a high molecular weight electret film which comprises an electret film of a blend of a poly(2,6-dialkyl-1,4-phenylene oxide) consisting of a recurring unit represented by the following general formula (1),

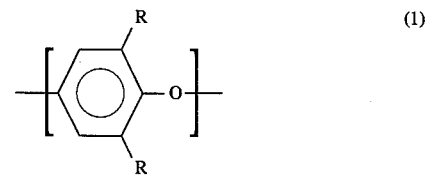

wherein R is an alkyl group having not more than 4 carbon atoms,
and a styrene resin.

According to the present invention, furthermore, there is provided a sleeve for conveying developing agent obtained by providing the above-mentioned high molecular electret film on an electrically conducting sleeve.

The electret film of the present invention exhibits a very good electric charge-retaining property and favorable adhesiveness to metals. Therefore, the electret film is very effectively used for a sleeve for conveying developing agent, for a cleaning device, for a transfer device, etc. in, for example, an electrophotographic apparatus, and stably exhibits desired effects for extended period of time.

DETAILED DESCRIPTION OF THE INVENTION

Figure 1:
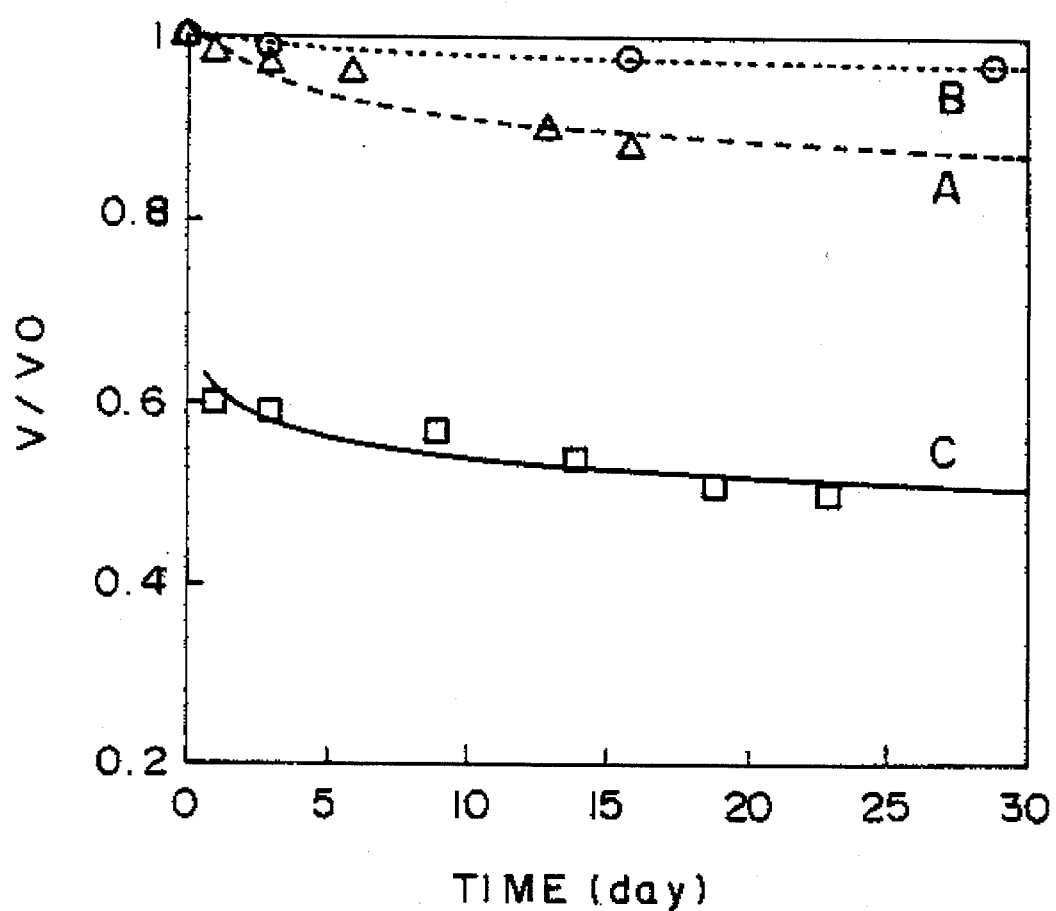
FIG. 1 is a diagram illustrating electric charge-retaining properties of electret films prepared according to Examples 1 and 2, and Comparative Example 1.

According to the present invention a poly(2,6-dialkyl-1,4-phenylene oxide) and a styrene resin are used in combination as high molecular materials for forming an electret film, exhibiting electric charge-retaining property that is so improved as can be compared with that of FEP and the like as well as markedly improved adhesiveness to a metal material such as electrically conducting sleeve or the like, and effectively avoiding the occurrence of cracks even after the passage of long periods of time from the coating and drying. Referring, for instance, to FIG. 1 illustrating changes in the electric charge-retaining factors of the electret films with the passage of time, the electret film composed of a polystyrene (curve) permits the electric charge-retaining factor to be attenuated to about 60% immediately after the coating and drying. The electret film of the present invention (curves A and B), on the other hand, permits the electric charge-retaining factor to be attenuated very little, and maintains the electric charge-retaining factor which is 904 or higher even after, for example, twenty days have passed.

The reasons why the electret film of the present invention possesses such an excellent electric charge-retaining property have not yet been clarified, but the present inventors postulate it as described below. That is, with the polystyrene electret film, peeling from the substrate metal is recognized three days after the application and drying. With the electret film of the present invention, however, no such peeling is observed. The polystyrene electret film peels since it has a low adhesiveness to the base metal and further develops defects such as pinholes or cracks due to poor tenacity of the film after formed by being applied and drying and is, hence, considered to have a low electric charge-retaining property. The electret film of the present invention, on the other hand, exhibits favorable adhesiveness to the base metal, does not almost permit such defects as pinholes and cracks to develop even when extended periods of time have passed from the formation of the film and, hence, offers good electric charge-retaining property.

poly(2,6-dialkyl-1,4-phenylene oxide)

According to the present invention as described already, a poly(2,6-dialkyl-1,4-phenylene oxide) consisting of a recurring unit represented by the above-mentioned general formula (1) can be used as a high molecular weight base for forming the film. In the general formula (1), R is an alkyl group having not more than 4 carbon atoms, such as methyl group, ethyl group, propyl group or butyl group. Particularly preferably, however, R should be methyl group. So far as the electric charge-retaining property is not impaired, furthermore, other monomer units may be copolymerized in small amounts in addition to the above-mentioned recurring unit.

The poly(2,6-dialkyl-1,4-phenylene oxide) needs have a molecular weight large enough for forming the film.

Styrene resin

In the present invention, the styrene resin used in combination with the above-mentioned base polymer is a thermoplastic resin comprising chiefly a styrene which may be composed not only of a homopolymer of styrene but also of a copolymer of styrene. In the present invention, in particular, there can be preferably used a styrene/diene copolymer comprising a styrene in an amount of from 99 to 60 mol % and, particularly, from 99 to 70 mol % and a diene monomer such as butadiene or isoprene in an amount of from 1 to 40 mol % and, particularly, from 1 to 30 mol %, or a blend of a polystyrene and the above diene polymer. These copolymer and blend pertain to so-called "shock-resistant polystyrene", work to improve adhesiveness of the electret film to the metal substrate or the like, and are very favorable from the standpoint of preventing the occurrence of pinholes and cracks. The styrene resin should have a molecular weight large enough for forming the film.

In the present invention, it is desired that the above-mentioned poly(2,6-dialkyl-1,4-phenylene oxide) and the styrene resin are used at a weight ratio of from 9:1 to 5:5 and, particularly, from 8:2 to 7:3. When the amount of the styrene resin is smaller than the above-mentioned range, its solubility in a solvent is impaired making it difficult to form the film. When the styrene resin is used in amounts larger than the above-mentioned range, the film loses the strength and the electric charge-retaining property becomes unsatisfactory.

Preparation of electret film

The electret film of the present invention is obtained by dissolving the above-mentioned poly(2,6-dialkyl-1,4-phenylene oxide) and the styrene resin in a suitable solvent to prepare a coating solution which is then applied onto a suitable substrate followed by drying.

The solvent may be any organic solvent that has been widely known and is, generally, an aromatic solvent such as toluene or the like, or a halogenated hydrocarbon solvent. The solvent is used in such an amount that a suitable coating property is obtained.

The electret film can be formed by any widely known method by applying it on the substrate followed by drying, such as a hot electret-forming method, an electroelectret-forming method, a corona charging method, radiant-ray electret-forming method or the like method. Generally, however, the corona-charging method is favorably used.

Applications

Owing to its such advantages as excellent electric charge-retaining property and favorable adhesiveness to metals, the electret film of the present invention can be effectively used for a variety of applications. Among such applications, the electret film of the invention can be very effectively used as a member in an electrophotographic apparatus such as a copying machine and, particularly, as a sleeve for conveying developing agent in the developer.

The sleeve for conveying developing agent is obtained by, for example, providing the above-mentioned electret film on an electrically conducting sleeve such as of aluminum, and works to convey the electrically charged developing agent to the developing zone (i.e., region facing the photosensitive material) in the developer utilizing coulomb force relative to the electret. The developing agent conveyed to the developing zone comes into contact with the surface of the photosensitive material on which predetermined electrostatic latent image is formed, whereby the latent image is visualized, i.e., developed.

In the sleeve for conveying the developing agent, it is desired that the electret film has a thickness which is usually from about 25 to about 500 μm and has a surface charge density of from about $10^{-10}$ to about $10^{-8}$ C/cm$^2$. When the surface charge density is too large, the electric attractive force acting between the developing agent and the electret layer becomes so great as to impair the migration of the developing agent onto the photosensitive material. When the surface charge density is too small, on the other hand, the developing agent is not effectively conveyed. Here, the polarity of charge in the electret film is set to be opposite to that of the charge of the developing agent that is to be conveyed, as a matter of course.

In the sleeve for conveying the developing agent, the electrically conducting sleeve that serves as a base for supporting the electret film is usually in a rotary cylindrical form, and the charged developing agent is fed onto the electret film by a known member such as a fur brush, draw-up rotor or the like.

In the sleeve for conveying the developing agent, the electret film stably maintains a polarized structure yet exhibiting favorable adhesiveness to the electrically conducting sleeve such as of aluminum. Therefore, the sleeve for conveying the developing agent exhibits good durability and makes it possible to stably convey the developing agent for extended periods of time.

The high-molecular weight electret film of the present invention can be very effectively used for the sleeve for conveying the developing agent in an electrophotographic apparatus and can, further, be used as, for example, a cleaning device and a dust collector disposed near a transfer device or a halogen lamp.

The cleaning device is to remove the toner remaining on the surface of the photosensitive material after developing and transfer, and is, usually, made up of a blade that is provided being in contact with the surface of the photosensitive material. That is, the remaining toner is scratched off by the blade. The cleaning device of this type has a problem in that the surface of the photosensitive material is deteriorated since the blade is contacting to the surface of the photosensitive material. This tendency becomes conspicuous particularly when use is made of an organic photosensitive material.

By using the high molecular electret film of the present invention and by setting the polarity of the surface charge to be opposite to the polarity of charge of the toner, on the other hand, the toner is trapped from the surface of the photosensitive material by the electric attractive force without deteriorating the surface of the photosensitive material. For instance, the electret film may be provided on the surface of the roller which is then driven keeping contact with the surface of the photosensitive drum. Since the roller needs not be brought into contact with the surface of the photosensitive material with large force unlike that of the blade, the surface is effectively prevented from being deteriorated. In this case, the toner trapped by the electret roller can be recovered by a suitable blade that is provided in contact with the roller. Therefore, the surface of the photosensitive material is not contaminated again by the toner that is trapped.

Moreover, the transfer device is usually constituted by a transfer charger which is disposed being opposed to the surface of the photosensitive material, and a transfer paper is permitted to pass through therebetween and corona charging is effected from the back surface of the transfer paper, so that the toner image formed on the surface of the photosensitive material migrates onto the transfer paper. In such a device, a high voltage must be generated using a high-tension transformer arousing a problem in cost.

According to the present invention, on the other hand, use is made of an electret plate obtained by forming on a suitable substrate the electret film of the invention having a surface charge of a polarity opposite to that of the charge of the toner instead of using the above-mentioned transfer charger, and the transfer paper is permitted to pass through between the photosensitive drum and the electret plate. It is therefore made possible to effect the transfer without using expensive members such as high-tension transformer and the like, presenting great advantage in cost.

It is further allowable to use an electret roller having a high molecular weight electret film formed on the surface thereof instead of using the electret plate.

EXAMPLES

Example 1

A polymer composition (trade name: NORYL®), produced by Nippon GE Plastic Co.) comprising 80 parts by weight of a poly(E,6-dimethyl-1,4-phenylene oxide) having an average molecular weight of 500,000 and 20 parts by weight of a shock-resistant polystyrene having an average molecular weight of 600,000 (styrene/butadiene copolymer, styrene 50 mo %), was homogeneously mixed together in toluene to prepare a coating solution for forming an electret film having a viscosity (25° C.) of 200 to 600 cps.

The coating solution was applied onto an aluminum sleeve followed by drying to form a film having a thickness of several tens of μm on the surface. The film was then subjected to a corona-discharge processing (main potential: 4.6 KV, grid potential: 400 V) for three minutes to prepare an electret film having a surface potential of 400 V.

The electret film was preserved in an environment of 25° C., 65% RH and a change in the surface potential was measured with the passage of time in order to calculate the surface charge-retaining factors with the passage of time. The results were as shown in FIG. 1 (curve A).

The above film was not at all peeled off the sleeve even when 60 days have passed after drying.

Example 2

By using a toner charged to a polarity opposite to that of the electret film formed in Example 1, a thin toner layer was formed on a sleeve on which the surface has been formed the above electret film and was preserved in this state in an environment of 25° C., 65% RH. The toner layer was removed with the air after the passage of every predetermined period of time, the surface potential on the electret film was measured, and the surface charge-retaining factors were calculated. The results were as shown in FIG. 1 (curve B).

It will be understood from FIG. 1 that the surface charge-retaining property is further improved in a state where there is formed a thin toner layer which is close to the one that is formed in a practical copying cycle.

Comparative Example 1

A coating solution was prepared quite in the same manner as in Example 1 but using the polystyrene only as a high molecular weight material, and an electret film was formed. The surface potential was 400 V.

The electret film was calculated for its surface charge-retaining factors in the same manner as in Example 1. The results were as shown in FIG. 1 (curve C).

This film partly peeled off the sleeve when three days have passed after drying.

We claim:

1. An electret film formed on an electrically conductive substrate which film comprises a blend of a poly(2,6-dialkyl-1,4-phenylene oxide) consisting of recurring units represented by the following general formula (1),

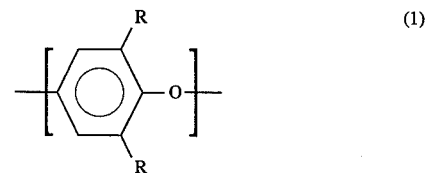

in which R is an alkyl group having 1 to 4 carbon atoms, and a styrene resin, wherein said blend contains said poly(2,6-dialkyl-1,4-phenylene oxide) and said styrene resin at a weight ratio of from 9:1 to 5:5, and said electret film has a surface charge density of $10^{-10}$ to $10^{-8}$ C/cm$^2$.

2. An electret film formed on an electrically conductive substrate according to claim 1, wherein said styrene resin is a styrene/diene copolymer or a blend of polystyrene polymer and a diene polymer.

3. An electret film formed on an electrically conductive substrate according to claim 1 wherein said styrene resin comprises 99 to 60 moles of styrene and 1 to 40 mols of butadiene.

4. An electret film formed on an electrically conductive substrate according to claim 1 wherein R is methyl.

5. An electret film formed on an electrically conductive substrate according to claim 1 wherein the electrically conductive substrate is a metal plate.

6. An electret film layer formed on the surface of an electrically conductive cylindrical sleeve, which layer comprises a blend of a Poly(2,6-dialkyl-1,4-phenylene oxide) consisting of recurring units represented by the following general formula(1),

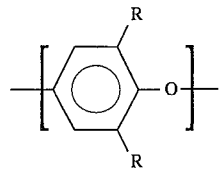

(1)

in which R is an alkyl group having 1 to 4 carbon atoms, and a styrene resin, wherein said blend contains the poly(2,6-dialkyl-1,4-phenylene oxide) and said styrene resin at a weight ratio of from 9:1 to 5:5, and said electret layer has a surface charge density of $10^{-10}$ to $10^{-8}$ C/cm$^2$.

7. An electret film formed on an electrically conductive sleeve according to claim 6 wherein said styrene resin comprises 99 to 60 moles of styrene and 1 to 40 mols of butadiene.

8. An electret film formed on an electrically conductive sleeve according to claim 6 wherein R is methyl.

9. An electret film formed on an electrically conductive sleeve according to claim 6 wherein the electrically conductive sleeve is a device for conveying a developing agent.

10. An electret film formed on an electrically conductive sleeve according to claim 6, wherein said styrene resin is a styrene/diene copolymer or a blend of a polystyrene polymer and a diene polymer.

11. A device for conveying a developing agent comprising an electret film layer formed on the surface of an electrically conducting sleeve, which layer comprises a blend of a poly(2,6-dialkyl-1,4-phenylene oxide) consisting of recurring units represented by the following general formula (1),

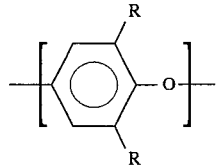

(1)

in which R is an alkyl group having 1 to 4 carbon atoms, and a styrene resin, wherein said blend contains the poly(2,6-dialkyl-1,4-phenylene oxide) and said styrene resin at a weight ratio of from 9:1 to 5:5, and said electret layer is formed by applying a coating solution which contains the blend to the surface of the electrically conductive sleeve, drying and electrically polarizing the electret layer to obtain a surface charge density of $10^{-10}$ to $10^{-8}$ C/cm$^2$.

12. A device according to claim 11 wherein said styrene resin comprises 99 to 60 moles of styrene and 1 to 40 mols of butadiene.

13. A device according to claim 11 wherein R is methyl.

14. A device according to claim 11 wherein the electrically conductive sleeve substrate is aluminum.

15. A device according to claim 11 wherein said styrene resin is a styrene/diene copolymer or a blend of a polystyrene polymer and a diene polymer.

* * * * *